United States Patent
Udden

[11] 3,878,955
[45] Apr. 22, 1975

[54] WHEEL-CHAIR TRANSPORT DEVICE FOR A PASSENGER CAR

[76] Inventor: Per E. C. Udden, Box 90, 861 00 Timra, Sweden

[22] Filed: Nov. 20, 1973

[21] Appl. No.: 417,673

Related U.S. Application Data

[63] Continuation of Ser. No. 95,638, Dec. 7, 1970, abandoned.

[30] Foreign Application Priority Data

Dec. 5, 1969 Sweden............................. 16756/69

[52] U.S. Cl............................ 214/450; 224/42.1 H
[51] Int. Cl.............................................. B60r 9/00
[58] Field of Search................... 214/450, 451, 454; 224/42.1 E, 42.1 H, 42.2, 42.21

[56] References Cited
UNITED STATES PATENTS

| | | | |
|---|---|---|---|
| 3,112,041 | 11/1963 | Havens | 214/450 |
| 3,531,006 | 9/1970 | Farchmin | 214/450 |
| 3,608,759 | 9/1971 | Spurgeon | 214/450 |

*Primary Examiner* — Albert J. Makay
*Assistant Examiner* — John Mannix
*Attorney, Agent, or Firm* — Fred Philpitt

[57] ABSTRACT

A wheel-chair transport device including a basket rotatably connected to a frame. The frame is attached to the vehicle in such a manner as to allow easy access to the wheel chair, when the basket is in the lowered position, and safe transport of the wheel-chair, on top of the vehicle, when the basket is in it's stored position.

A great number of invalids are capable of driving a car and move about by means of hand operated wheel-chairs but cannot at all or only with great difficulty bring the wheel-chair with them in the car. Special designs of wheel-chairs are adapted to facilitate the transport and a three part wheel-chair is known, wherein each part has such a weight that the invalid by himself can lift the parts into the car and place them, e.g., in the back seat. Extremely light wheel-chairs have also been designed so as to answer these transport requirements. In certain cars the problem has been solved so that the wheel-chair can be driven in behind the driver's seat, either from the back of the car or through a wide front door.

9 Claims, 3 Drawing Figures

WHEEL-CHAIR TRANSPORT DEVICE FOR A PASSENGER CAR

This is a continuation of application Ser. No. 95,638, filed Dec. 7, 1970 now abandoned.

The object of the present invention is to make possible the transport of a wheel-chair in a simple manner.

This object is realized according to the present invention substantially by a transport member in the form of e.g. a basket or a cassette for the wheel-chair, which is rotably connected to a frame being mounted on the car, the axis of rotation being substantially horizontal and located at such a height above the ground that the transport member in its outwardly rotated end position is located at the side of the car with an aperture directed towards the ground, through which the wheel-chain by means of lift means can be lifted up or down, said transport member in its inwardly rotated end position being located above the roof of the car, where it conveniently rests against a support means.

Figure 1:
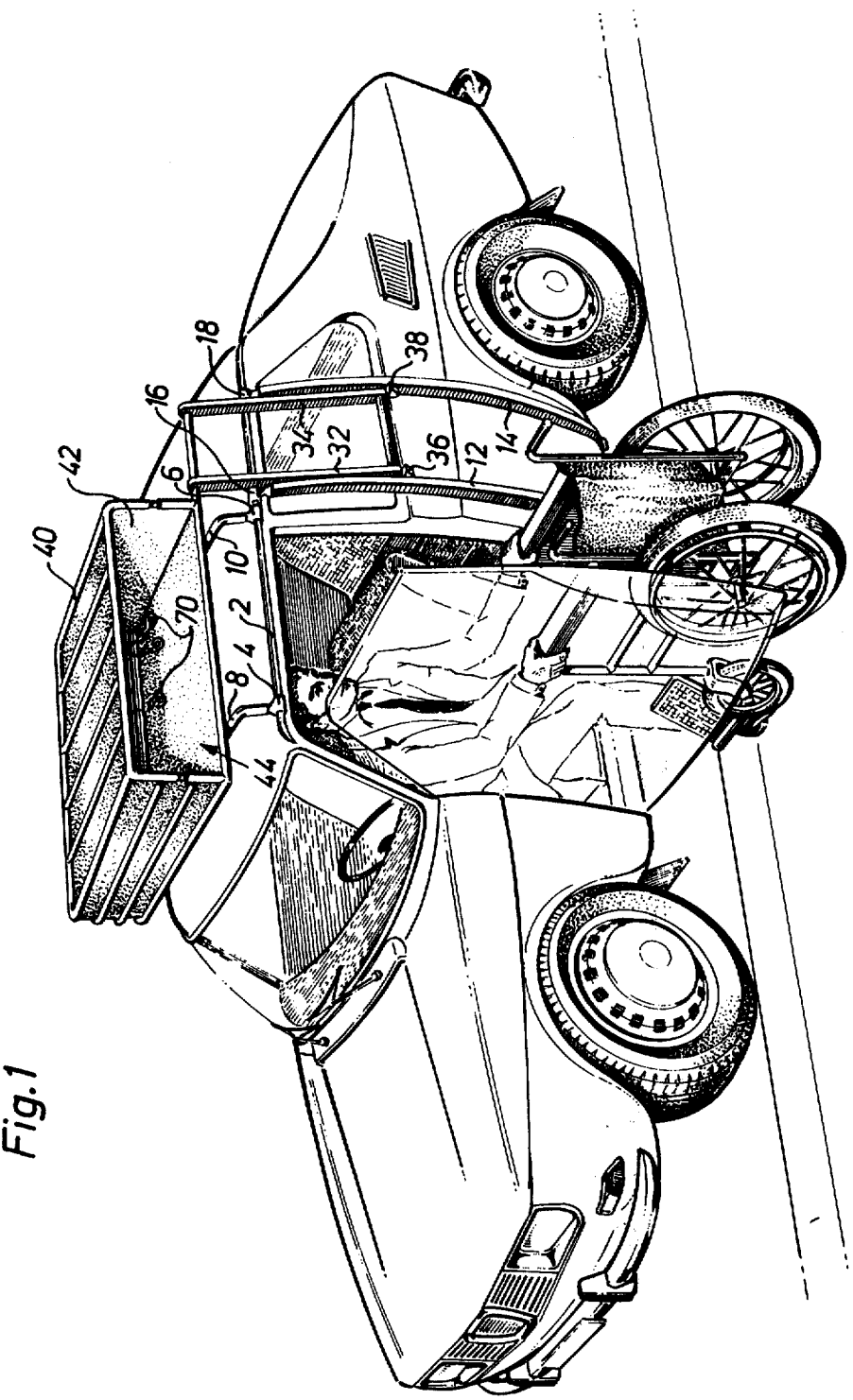
Figure 2:
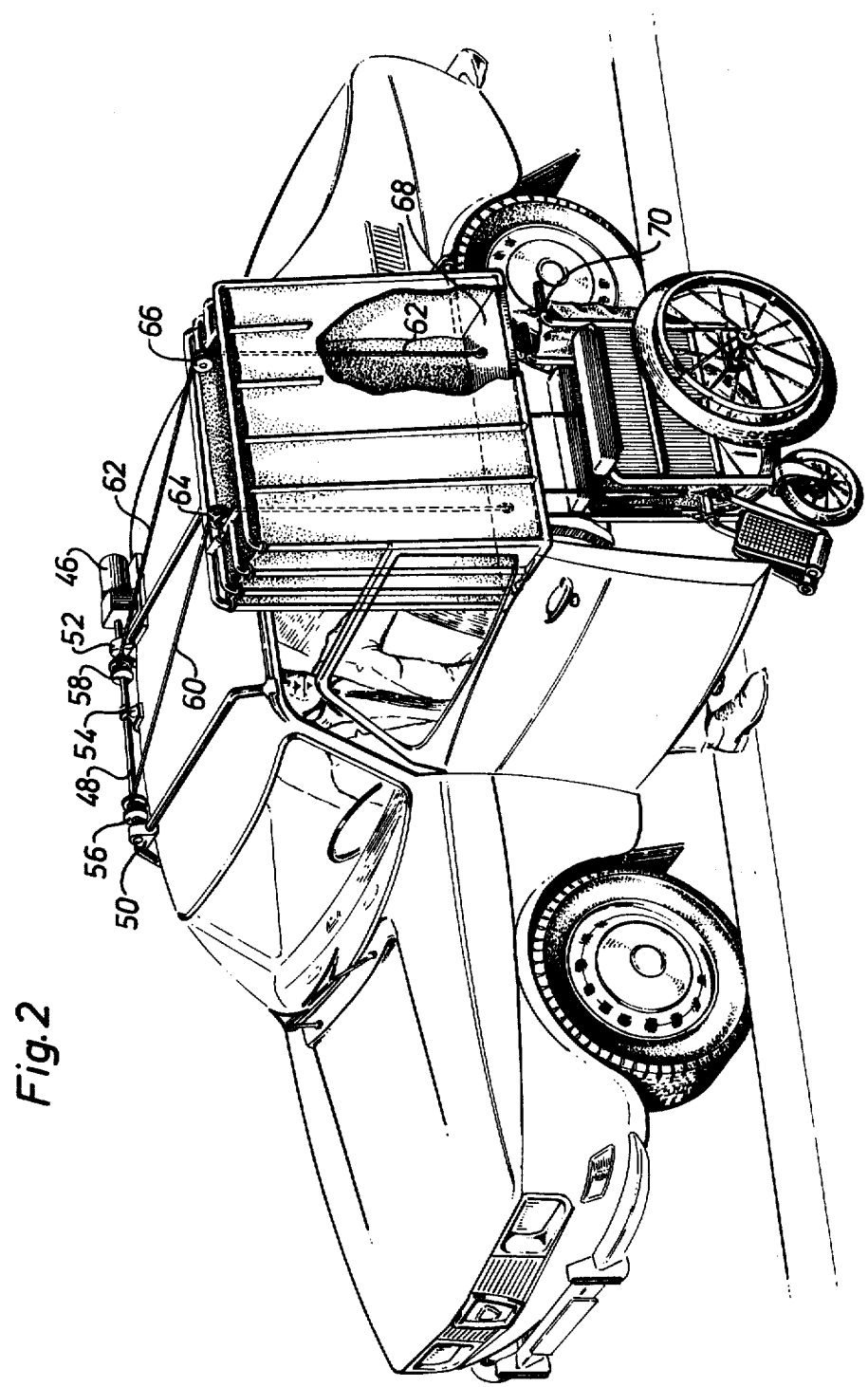

An exemplary embodiment of the invention is described below with reference to the accompanying drawings, on which FIG. 1 shows how a person from his place in the driver's seat folds the wheel-chair, FIG. 2 how the wheel-chair is lifted up into a cassette, which is located in its outwardly rotated end position and FIG. 3 the cassette in its inwardly rotated end position over the roof of the car and with the wheel-chair in transport position.

The illustrations show a conventional passenger car at the roof strips 2 of which a rack structure is secured, as indicated at 4 and 6, said structure comprising two carrier strips 8 and 10. Only the roof strip at one side of the car is shown on the drawings. At the same side there is further a frame structure, comprising two beams 12 and 14, which at their upper ends are secured to the corresponding roof strip 2 at 16 and 18 respectively. At their lower ends the beams 12 and 14 are secured to one side frame beam of the car, as indicated at 20 and 22 respectively. Between the beams 12 and 14 extends a round torsion rod 24, one end portion of which is non-rotatably connected to the beam 14 at 26 and the other end portion of which is rotatably supported in the beam 12 at 28. The torsion rod 24 is surrounded by a tube 30, at the ends of which two parallel strips 32 and 34, respectively, are secured. The tube 30 is non-rotatably connected to the torsion rod 24 at the strip 32 and at the strip 34 rotatably supported on the torsion rod. The arrangement 24, 30 forms a torsional spring device, the rest position of which occurs when the strips 32 and 34 are directed substantially straight outwards from the side of the car. Further rotation of the strips 32 and 34 in a direction downwards is prevented by two abutments 36 and 38 secured to one each of the beams 12 and 14.

Figure 3:
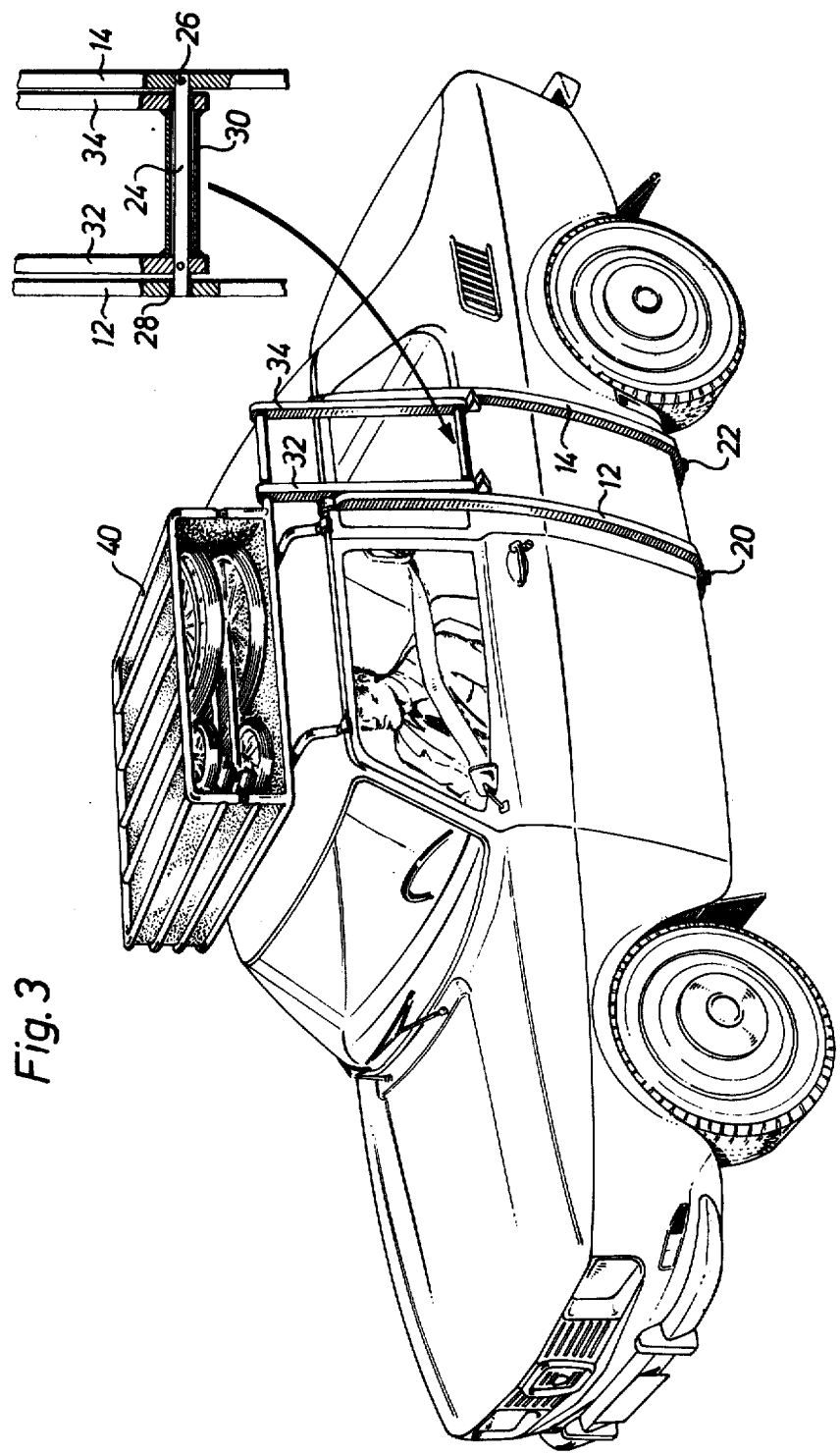

The strips 32 and 34 at their other ends carry a cassette 40 comprising a tube structure, internally covered with a strong tarpaulin or sun-blind fabric 42, which at one short side of the tube structure, shown in FIGS. 1 and 3, leaves an opening to the interior of the cassette.

Adjacent the far side of the car an electric motor 46 is mounted on the car roof, said motor driving a shaft 48, which is rotatably supported in bearing means 50 and 52, respectively, secured to the roof. Near each of the carrier beams 8 and 10, respectively, the shaft 48 carries a pulley 56 and 58, respectively, on which a wire 60 and 62, respectively is fixed with one of its ends and adapted to be wound up. The wires run over pulleys 64 and 66, which are rotatably supported at the side of the tube structure 40 directed away from the opening 44. At their free ends the wires carry a plate 68 movable in the cassette. At its side directed towards the opening 44, the plate 68 carries mechanical securing means in the form of hooks 70 or the like.

The device described above operates in the following manner.

FIG. 1 shows how a person folds a wheel-chair so that it may be accommodated in the cassette 40. In its position on the roof of the car the cassette 40 is secured by means of the wires 60 and 62 and optional locking members (not shown) against the force of the torsion spring means 24, 30. The cassette is moved to the outwardly rotated position shown in FIG. 2, wherein the strips 32 and 34 extend straight outward from the side of the car, by starting the motor, e.g., from inside the car, which feeds out the wires 60, 62, the torsion spring means rotating the cassette to said position. Thereafter the hooks 70 are fastened to the wheel-chair in a convenient manner and the motor 46 is started so as to by means of the wires 60, 62 lift the wheel-chair, which is still in the position illustrated in FIG. 2, up into the cassette, until the plate 68 abuts the bottom of the cassette. Thereafter the cassette is automatically caused to follow the rotary movement upwards to abutment against the rack structure 8, 10 in the manner illustrated in FIG. 3. In this position the cassette can be locked by means of a mechanical pawl which is operated either from inside the car or automatically, when the cassette has arrived in its inwardly rotated end position. The pawl can be released from inside the car, e.g., in a mechanical or electro-mechanical manner.

The present invention is of course not limited to the embodiment described and shown. Instead of electrically driven wires hand operated wires may, e.g., be used for lifting up the wheel-chair. Generally it is most convenient to lift down the wheel-chair on the side of the car where the driver's seat is located but a great number of invalids find it easier to take place on the passenger seat and thereafter slide over to the driver's seat. When the wheel-chair is inserted into the cassette but the latter is still in the position according to FIG. 2 it is possible, if required, to close the opening of the cassette by means of a cloth cover (not shown), which is secured to the edge of the openings. Ig is understood that the cassette may be so wide that the wheel-chair need not be folded but it is of course advantageous that the height of the vehicle in the transport state is as low as possible. In certain cases it is preferable to avoid that the top portion of the transport member during the rotary movement comes too high up, e.g., in garages where the ceiling height is low and it is then possible to use special arrangements in the form of rails, which are folded out separately when the transport memeber has been rotated outwards an angle of 30° to 45°. In other cases it may be convenient that the sun-blind fabric which protects the wheel-chair is first placed around the wheel-chair and thereafter mounted to the mechanical securing means, whereafter the chair is lifted up by means of the transport member.

I claim:

1. A wheelchair transport device that is adapted to be mounted on a car, which comprises in combination:
   a. a generally tubular wheelchair housing means which is adapted to substantially surround and house within it a wheelchair that is in a compactly folded condition, b. moving means having an outer side and an inner side, c. the outer side of said moving means being connected to a lower exterior portion of said wheelchair housing, d. pivotal mounting means adapted to be mounted on the exterior of a car, e. the inner side of said moving means being mounted in said pivotal mounting means for moving said wheelchair housing back and forth through an arc of approximately 90°, from a substantially horizontal position wherein said wheelchair housing is overlying the roof of a car to a substantially vertical position alongside the car with the lower end of the wheelchair housing located intermediate the top and bottom of the car, f. engaging members disposed within the interior of said wheelchair housing means, said engaging members being adapted to engage a wheelchair that is located on the ground next to a vehicle, when said wheelchair housing is in said vertical position, g. cable means associated with said engaging members for lifting a wheelchair into the interior of the wheelchair housing, h. motor means for said moving means and said cable means i. means for enabling actuation of said motor means from inside a car.

2. A wheelchair transport device that is adapted to be mounted on a car, which comprises in combination:

a. a wheelchair housing means which is adapted to substantially surround and house within it a wheelchair, b. moving means, c. one side of said moving means being connected to said wheelchair housing, d. pivotal mounting means adapted to be mounted on the exterior of a car, e. the opposite side of said moving means, being mounted in said pivotal mounting means for moving said wheelchair housing back and forth through an arc, from a substantially horizontal position to a substantially vertical position, f. engaging members disposed within the interior of said wheelchair housing means, said engaging members being adapted to engage a wheelchair that is sitting on the ground next to a vehicle, g. lifting means associated with said engaging members, said lifting means being adapted to lift a wheelchair into the interior of the wheelchair housing, h. motor means for said moving means and said lifting means.

3. A device according to claim 2 wherein said pivotal mounting means contains resilient means for biasing said moving means towards a position that is generally parallel to the ground.

4. A device according to claim 2 wherein said lift means comprising a cable and winding means for lengthening and shortening said cable.

5. A device according to claim 2 further comprising means for enabling actuation of said motor means from inside a car.

6. A wheelchair transport device that is adapted to be mounted on a car, which comprises in combination:

a. a wheelchair housing means which is adapted to substantially surround and house within it a wheelchair, b. moving means adapted to be pivotally mounted on the exterior of a car, c. one side of said moving means being connected to a portion of said wheelchair housing, d. means for pivoting said moving means back and forth from a first position wherein said wheelchair housing is located alongside a car to a second position wherein said wheelchair housing is overlying a car, e. engaging members disposed within the interior of said wheelchair housing means, said engaging members being adapted to engage a wheelchair that is sitting on the ground next to a vehicle, f. lifting means associated with said engaging members, said lifting means being adapted to lift a wheelchair into the interior of the wheelchair housing.

7. A device according to claim 6 further comprising means for enabling actuation of said pivoting means and said lifting means from inside a car.

8. A wheel-chair transport device that is adapted to be mounted on a car, which comprises in combination:

a. a generally tubular wheel-chair housing means which is adapted to substantially surround and house within it a wheelchair that is in a compactly folded condition, b. a rigid framework having an outer side and an inner side, c. the outer side of said rigid framework being rigidly connected to a lower exterior portion of said wheel-chair housing at approximately a right angle, d. a horizontally disposed pivotal mounting means adapted to be mounted on the exterior side of a car at a point that is approximately midway between the top and bottom of the car, e. the inner side of said rigid framework being mounted in said pivotal mounting means whereby said rigid framework is able to move back and forth through an arc of approximately 90°, from a substantially horizontal position to a substantially vertical position, about said pivotal mounting means, f. engaging members disposed within the interior of said wheel-chair housing means, said engaging members being adapted to engage a wheel-chair that is located on the ground next to a vehicle, g. cable means interconnecting a point on said car with said wheel-chair housing, said cable means being adapted to 1. lift a wheel-chair into the interior of the wheelchair housing, and 2. lift the wheel-chair housing from a first substantially vertical position alongside a car to a second substantially horizontal position overlying the roof of the car, and h. means for resiliently biasing said rigid framework toward a position that is generally parallel to the ground.

9. A wheel-chair transport device that is adapted to be mounted on a car, which comprises in combination:

a. a wheel-chair housing means which is adapted to substantially surround and house within it a wheelchair, b. a rigid framework,
c. one side of said rigid framework being rigidly connected to a lower exterior portion of said wheel-chair housing,
d. pivotal mounting means adapted to be mounted on the exterior side of a car at a point intermediate the top and bottom of the car,
e. the opposite side of said rigid framework being mounted in said pivotal mounted means whereby said rigid framework is able to move back and forth through an arc, from a substantially horizontal position to a substantially vertical position about, said pivotal mounting means,
f. engaging members disposed within the interior of said wheel-chair housing means, said engaging members being adapted to engage a wheel-chair that is sitting on the ground next to a vehicle,
g. lifting means associated with said wheel-chair housing and said engaging members, said lifting means being adapted to
  1. lift a wheel-chair into the interior of the wheel-chair housing, and
  2. lift the wheel-chair housing from a first position alongside a car to a second position above the roof of the car.

* * * * *